(12) United States Patent
Lambert et al.

(10) Patent No.: US 9,650,930 B2
(45) Date of Patent: May 16, 2017

(54) EMISSION CONTROL DEVICE REGENERATION

(71) Applicant: Ford Global Technologies, LLC, Dearborn, MI (US)

(72) Inventors: Christine Kay Lambert, Dearborn, MI (US); Douglas Allen Dobson, Ypsilanti, MI (US); James Robert Warner, Grosse Pointe Farms, MI (US); James David Pakko, Dearborn, MI (US); Jeffrey Scott Hepburn, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 14/594,324

(22) Filed: Jan. 12, 2015

(65) Prior Publication Data
US 2016/0201534 A1    Jul. 14, 2016

(51) Int. Cl.
*F01N 3/00*   (2006.01)
*F01N 3/02*   (2006.01)
(Continued)

(52) U.S. Cl.
CPC ........... *F01N 3/0253* (2013.01); *F01N 3/035* (2013.01); *F01N 3/101* (2013.01); *F01N 9/002* (2013.01); *F01N 13/009* (2014.06); *F02D 41/029* (2013.01); *F01N 2560/025* (2013.01); *F01N 2560/06* (2013.01); *F01N 2900/0416* (2013.01); *F01N 2900/1624* (2013.01); *F02D 41/024* (2013.01); *F02D 41/0235* (2013.01); *F02D 41/123* (2013.01); *F02D 2200/0802* (2013.01); *F02D 2200/0812* (2013.01); *F02D 2200/0814* (2013.01); *F02D 2200/0816* (2013.01); *Y02T 10/22* (2013.01); *Y02T 10/47* (2013.01)

(58) Field of Classification Search
CPC ...... F01N 13/009; F01N 3/0253; F01N 3/035; F01N 3/101; F01N 9/002; F01N 2560/025; F01N 2560/06; F01N 2900/0416; F01N 2900/1624; F02D 41/024; F02D 41/025; F02D 41/123; F02D 2200/0814; F02D 2200/0816
USPC ........................................... 60/297, 299, 311
See application file for complete search history.

(56) References Cited

U.S. PATENT DOCUMENTS 8,402,751 B2    3/2013 Bidner et al.
2009/0193796 A1   8/2009 Wei et al.
(Continued)

FOREIGN PATENT DOCUMENTS

WO    2013135717 A1    9/2013

OTHER PUBLICATIONS

Anonymous, "Decrease Thermal Exposure While Shorten DeSOx Time During LNT DeSOx," IPCOM No. 000125179, Published May 23, 2005, 3 pages.

*Primary Examiner* — Nicholas J Weiss
*Assistant Examiner* — Dapinder Singh
(74) *Attorney, Agent, or Firm* — Julia Voutyras; McCoy Russell LLP

(57) ABSTRACT

Various methods are provided for operating an emission control device. In one example, a method for an emission control device including a catalyst and a filter comprises passively regenerating the filter, and adjusting, via a controller, a duration of active regeneration of the filter based on an oxygen storage capacity of the emission control device.

18 Claims, 6 Drawing Sheets

(51) Int. Cl.
*F01N 3/10* (2006.01)
*F01N 3/20* (2006.01)
*F01N 3/025* (2006.01)
*F01N 3/035* (2006.01)
*F01N 9/00* (2006.01)
*F01N 13/00* (2010.01)
F02D 41/02 (2006.01)
F02D 41/12 (2006.01)

(56) References Cited

U.S. PATENT DOCUMENTS

2011/0030346 A1* 2/2011 Neubauer ............ B01D 53/944
 60/274
2011/0073088 A1* 3/2011 Hubbard ................ F01N 3/021
 123/703

* cited by examiner

EMISSION CONTROL DEVICE REGENERATION

FIELD

The field of the disclosure generally relates to emission control devices.

BACKGROUND AND SUMMARY

Some internal combustion engines employ a particulate filter in an exhaust system to trap particulate matter flowing through the exhaust system and thereby meet emission standards. A turbocharged, spark-ignition engine may employ a particle filter to trap soot, for example. As particulate matter accumulates in a particulate filter, exhaust backpressure will increase, which can adversely affect fuel economy. Accordingly, a particulate filter may be periodically regenerated by oxidizing stored particulate matter. A regeneration reaction requires oxygen and suitable temperature conditions. Supplying excess oxygen for a regeneration reaction in a spark-ignition may be difficult, however, as spark-ignition engines are typically operated under stoichiometric conditions.

U.S. Patent Application No. 2011/0073088 discloses methods of regenerating a particulate filter in a spark-ignition engine. In one example, deceleration fuel shut-off (DFSO) is utilized to supply excess oxygen to a particulate filter and thereby facilitate regeneration of the filter. Passive filter regeneration is also described in which soot stored in a filter may be oxidized without explicitly modifying engine operation to increase the supply of excess oxygen to the filter.

The inventors herein have recognized an issue with the approach identified above. Excess oxygen supplied to a particulate filter for a regeneration reaction during DFSO may be completely consumed by the regeneration reaction. While this may sufficiently regenerate the filter, oxygen stored in the exhaust system (e.g., in a catalyst washcoat) may be depleted and cannot be replenished due to the complete consumption of excess oxygen during the regeneration reaction. In this case, passive filter regeneration cannot be performed without supplying excess oxygen via other means.

One approach that at least partially addresses the above issues includes a method for an emission control device including a catalyst and a filter, comprising passively regenerating the filter, and adjusting, via a controller, a duration of active regeneration of the filter based on an oxygen storage capacity of the emission control device.

In a more specific example, the method further comprises determining an amount of particulate matter stored in the filter, and actively regenerating the filter if the amount of particulate matter is greater than or equal to a threshold.

In another example, active regeneration of the filter includes initiating deceleration fuel shut-off.

In yet another example, the method further comprises extending a duration of deceleration fuel shut-off to replenish at least a portion of oxygen stored in the emission control device.

In this way, DFSO initiated as part of active filter regeneration may be utilized to replenish oxygen stored in the emission control device, which may increase the frequency with which passive filter regeneration may be performed. Consequently, the frequency with which engine operation is modified to supply excess oxygen for filter regeneration may be reduced, which may increase fuel economy and vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Finally, the above explanation does not admit any of the information or problems were well known.

DETAILED DESCRIPTION

Figure 1:
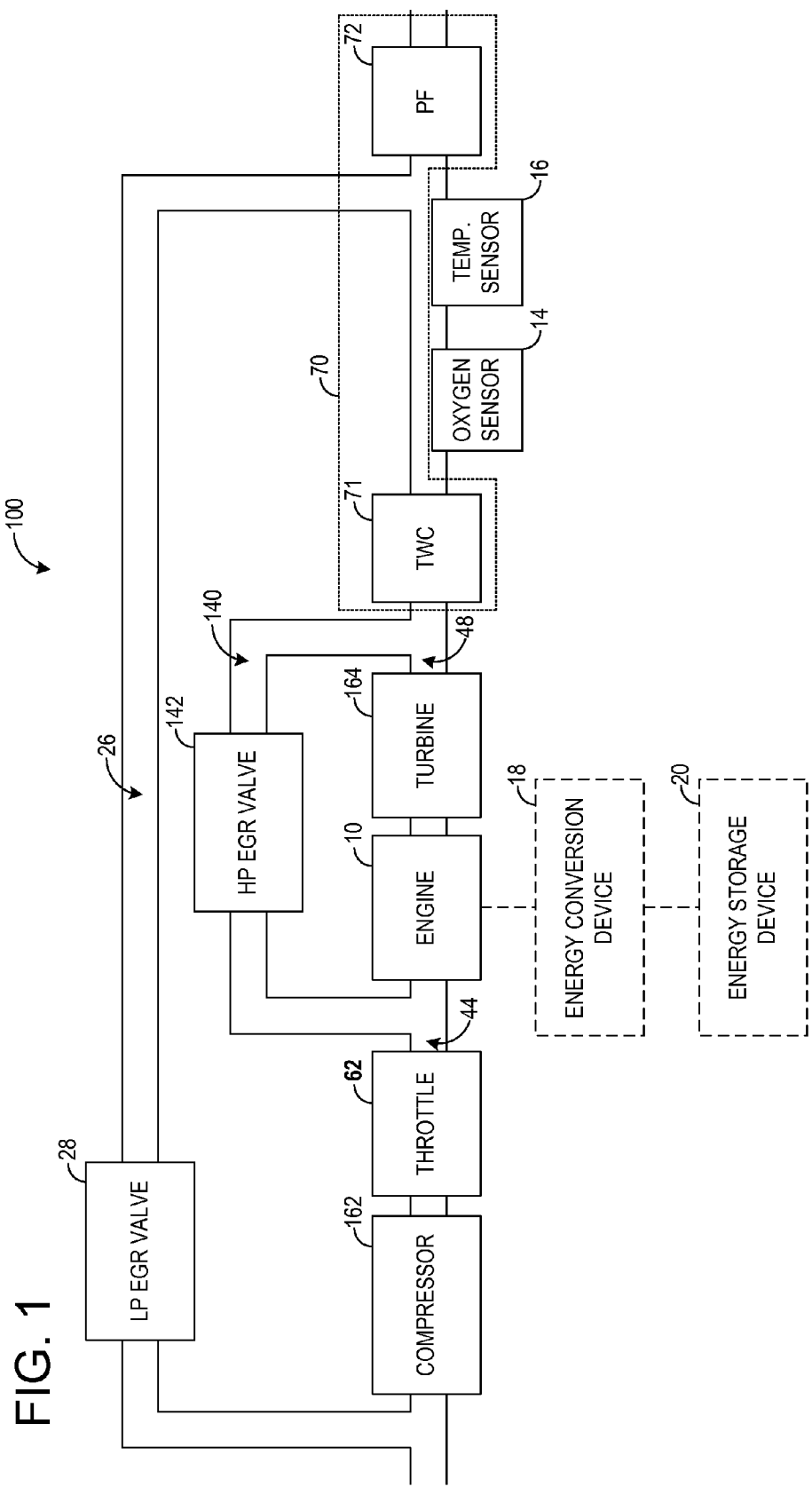
FIG. 1 is a block diagram of a system in a vehicle.
Figure 2:
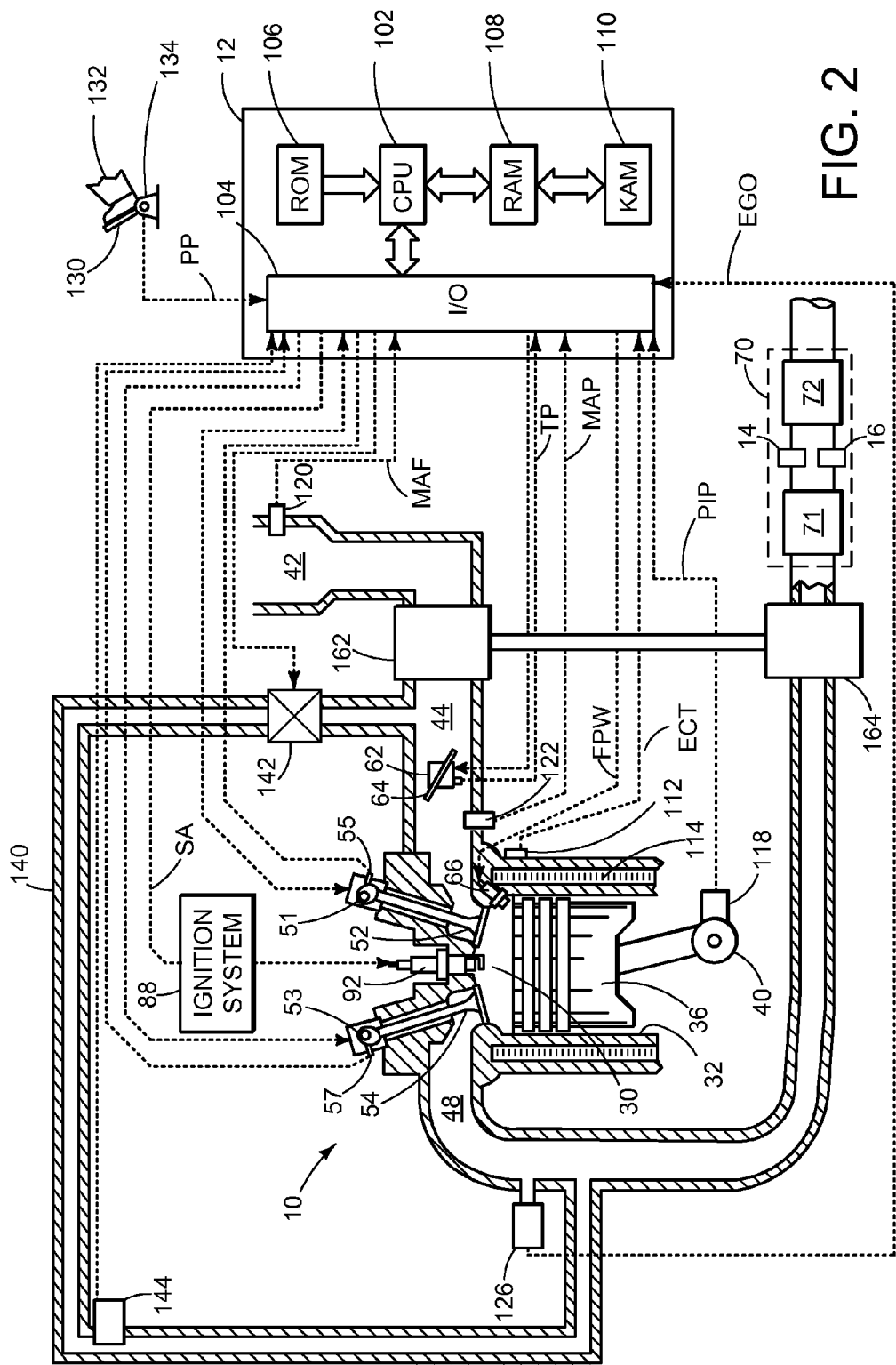
FIG. 2 is a schematic view of an engine of a vehicle.
Figure 3:
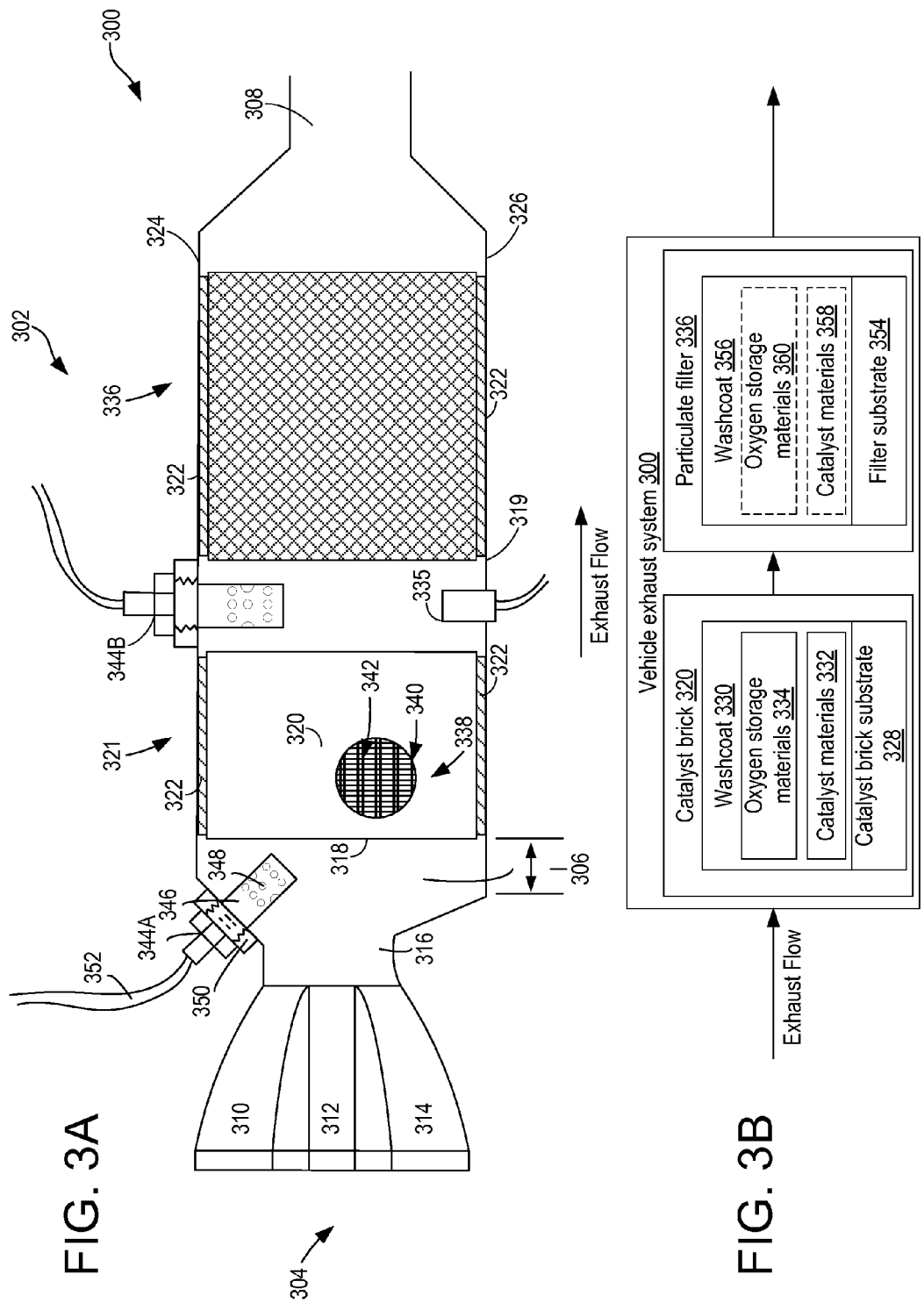
FIG. 3A shows an example vehicle exhaust system including an emission control device.
FIG. 3B shows a block diagram illustrating aspects of the vehicle exhaust system of FIG. 3A.
Figure 4:
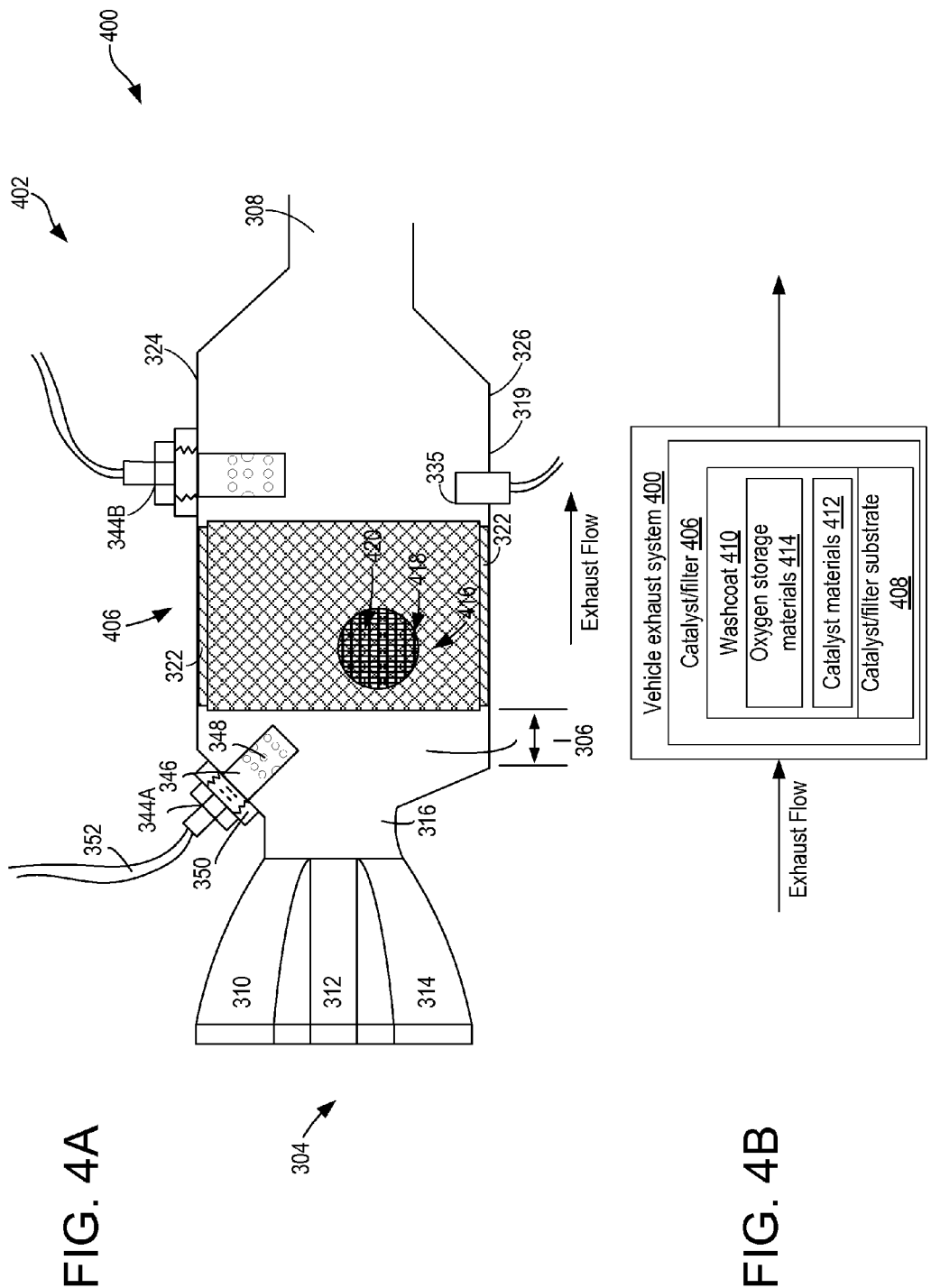
FIG. 4A shows another example vehicle exhaust system including an emission control device.
FIG. 4B shows a block diagram illustrating aspects of the vehicle exhaust system of FIG. 4A.
Figure 5:
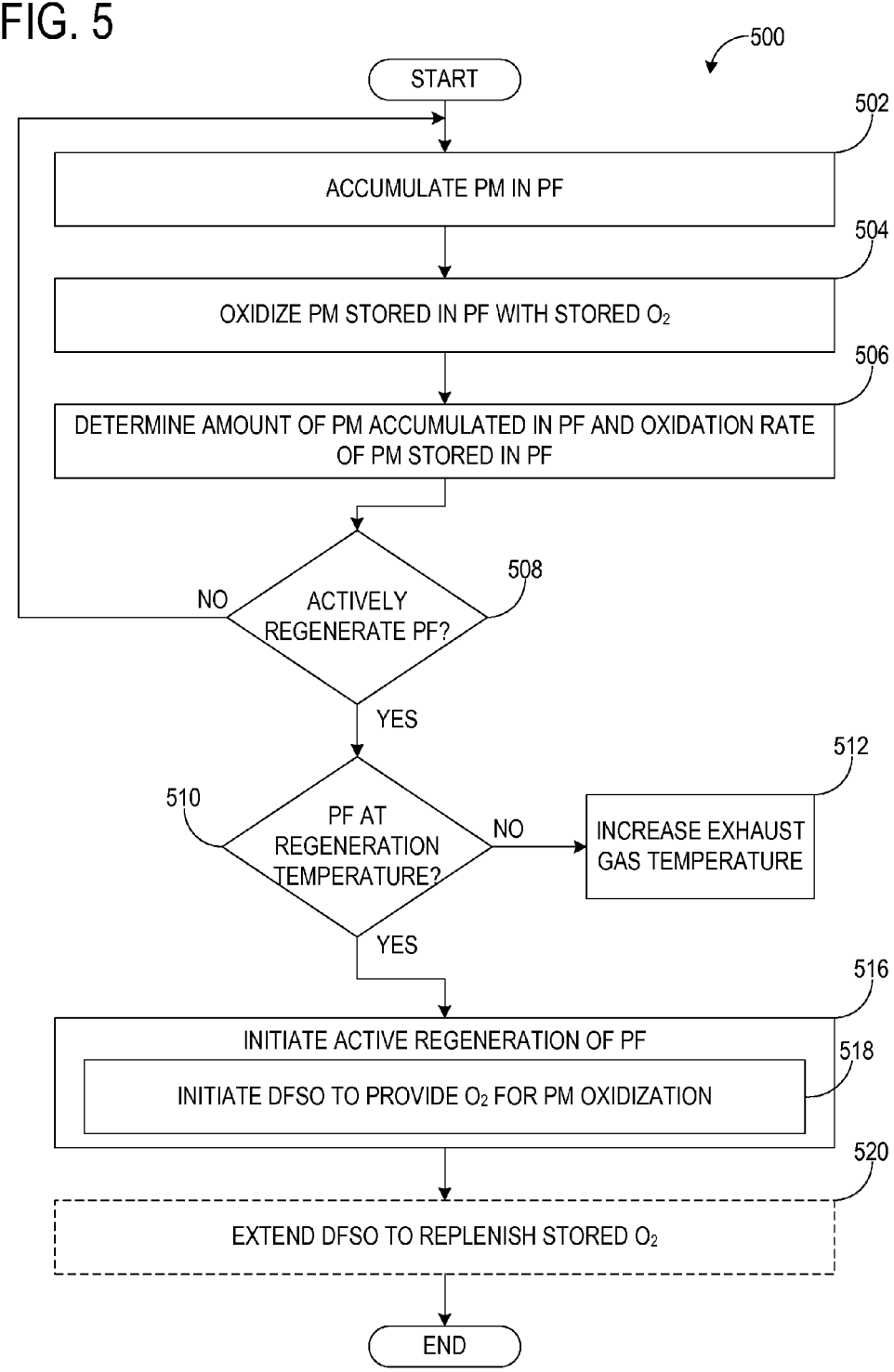
FIG. 5 shows a flowchart illustrating a method of regenerating a particulate filter of an emission control device.
Figure 6:
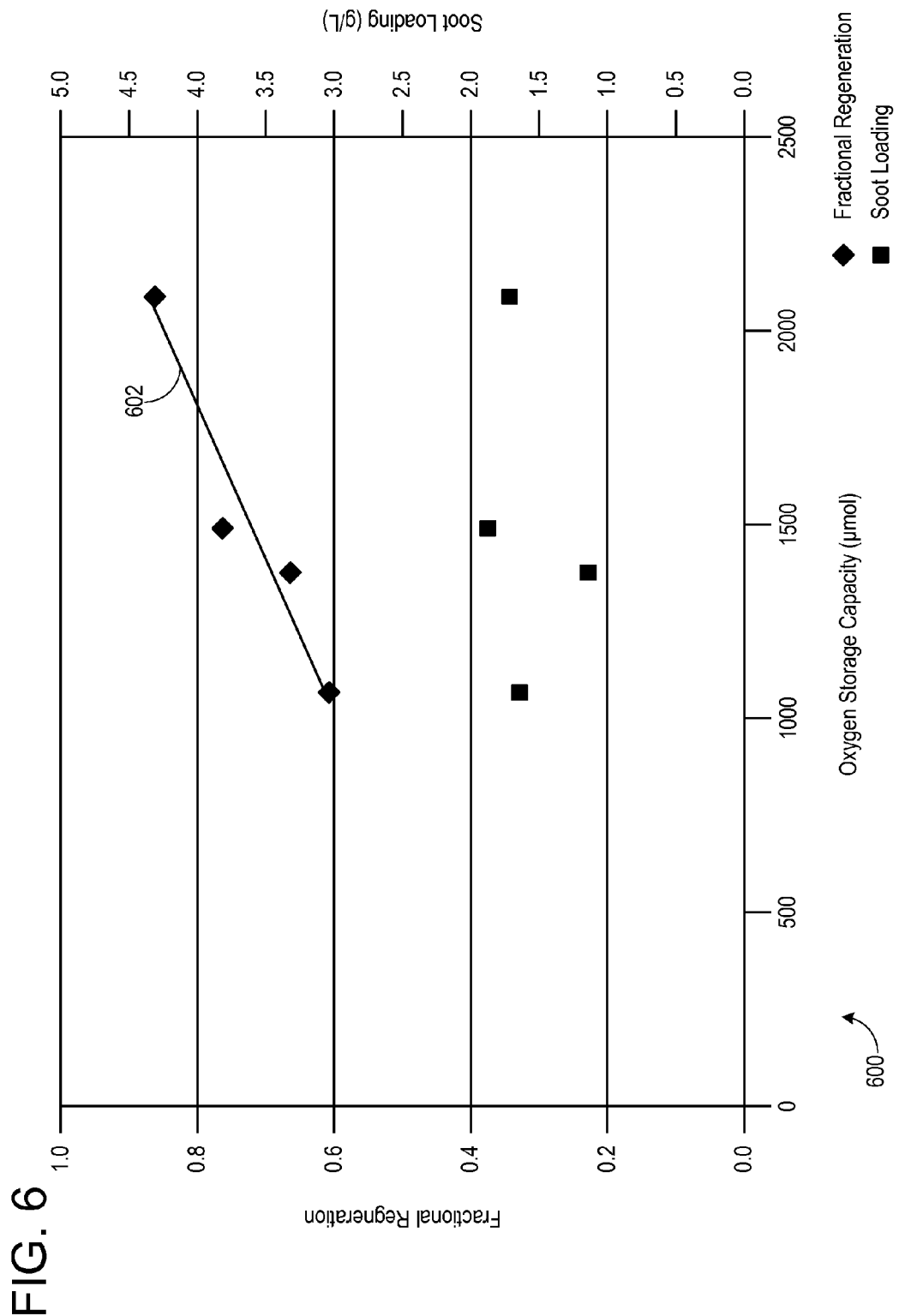
FIG. 6 shows a graph illustrating how filter regeneration varies as a function of oxygen storage capacity.

Various methods are provided for operating an emission control device. In one example, a method for an emission control device including a catalyst and a filter comprises passively regenerating the filter, and adjusting, via a controller, a duration of active regeneration of the filter based on an oxygen storage capacity of the emission control device. FIG. 1 is a block diagram of a system in a vehicle, FIG. 2 is a schematic view of an engine of a vehicle, FIG. 3A shows an example vehicle exhaust system including an emission control device, FIG. 3B shows a block diagram illustrating aspects of the vehicle exhaust system of FIG. 3A, FIG. 4A shows another example vehicle exhaust system including an emission control device, FIG. 4B shows a block diagram illustrating aspects of the vehicle exhaust system of FIG. 4A, FIG. 5 shows a flowchart illustrating a method of regenerating a particulate filter of an emission control device, and FIG. 6 shows a graph illustrating how filter regeneration varies as a function of oxygen storage capacity. The engine of FIGS. 1 and 2 also includes a controller configured to carry out the method depicted in FIG. 5.

FIG. 1 schematically depicts a system 100 including an internal combustion engine 10, which is a direct-injection, spark-ignition engine in some examples. The engine 10 may have a plurality of cylinders, and engine output torque may be transmitted to a transmission (not shown), which may be, in turn, coupled to a drive wheel in contact with a road surface. The transmission may be a manual transmission, automatic transmission, or combinations thereof. Further, various additional components may be included, such as a torque converter, and/or other gears such as a final drive unit, etc.

The system 100 includes a turbocharger including a turbine 164 downstream of the engine 10 and a compressor 162 upstream of the engine 10. A throttle 62 for controlling air intake into the intake manifold 44 is shown positioned downstream of the compressor 162. In other examples, the throttle 62 may be positioned upstream of the compressor 162, and/or additional throttles may be provided.

The system 100 is also equipped with a high-pressure (HP) EGR passage 140 having a first opening downstream of the throttle 62 and upstream of cylinders of the engine 10, and a second opening downstream of the turbine 164 and upstream of a particulate filter (PF) 72, by which exhaust gas can be recirculated. A high-pressure (HP) EGR valve 142 is positioned between the first opening and second opening of the HP EGR passage 140, and can be positioned based on current engine operating conditions. For example, the HP EGR valve 142 may be open during engine running when engine boost from the turbocharger is not desired.

The system 100 may also include a low-pressure EGR conduit 26 having a low-pressure (LP) EGR valve 28. The low-pressure EGR conduit 26 may re-circulate gas from an opening downstream of a three-way catalyst (TWC) 71 to a position upstream of the compressor 162, for example, when engine boost is desired and/or being carried out by the turbocharger, and while the HP EGR valve 142 is closed.

The system 100 may further include an emission control device (ECD) generally indicated at 70. In the depicted embodiment, ECD 70 includes the TWC 71 and the PF 72 positioned downstream of the TWC. The engine 10 may thus be configured to output exhaust, via exhaust passage 48, to the TWC 71 positioned downstream of the engine 10. One or more exhaust sensors may be positioned in exhaust passage 48. For example, an oxygen sensor 14 and a temperature sensor 16 are positioned downstream of the TWC 71 to measure excess oxygen and temperature, respectively. Excess oxygen may be expressed as a percentage of oxygen in an airflow in the exhaust passage 48, for example. It will be appreciated, however, that there may be additional oxygen and/or temperature sensors upstream of, downstream of, or coupled to each of the TWC 71 and the PF 72. The TWC 71 may be positioned upstream of the particulate filter 72 in order to reduce emissions so that soot and other particulates received at the PF 72 are largely inert. The TWC 71 and PF 72 may thus cooperate to simultaneously reduce hydrocarbons, carbons monoxide, nitrogen oxides, soot, etc. In other embodiments, however, the TWC 71 may be positioned downstream of the PF 72. Further, the PF 72 may be arranged between two or more three-way catalysts, or other emission control devices (e.g., selective catalytic reduction system, NOx trap) or combinations thereof.

In some embodiments, PF 72 may include one or more catalyst materials in addition to components configured to filter exhaust gas. For example, PF 72 may be coated with a washcoat including one or more catalyst materials. In some examples, the washcoat may further include one or more materials configured to enable the storage of oxygen in PF 72, referred to herein as "oxygen storage materials", which may be used to regenerate the PF under select conditions. Such a configuration may be employed for embodiments in which engine 10 is spark-ignited, for example. In some embodiments, the TWC 71 and PF 72 may be separate components comprising separate housings positioned away from each other (e.g., the TWC being upstream of the PF as shown in FIG. 1). In other embodiments, the TWC 71 and PF 72 may be integrated into a unitary ECD. The unitary ECD may provide catalytic conversion and filtering via a single, unitary structure, and may further integrate one or more oxygen storage materials. Details regarding exemplary ECDs are provided below with reference to FIGS. 3A-B. It will be understood, however, that ECD 70 is provided as a non-limiting example and that, in other embodiments, the ECD may include other components in addition to or in lieu of TWC 71 and/or PF 72, including but not limited to a lean $NO_x$ trap, an SCR catalyst, a diesel or gasoline particulate filter, and an oxidation catalyst.

In some implementations, engine 10 may be configured as a turbocharged, spark-ignition engine, in which case PF 72 may be a gasoline particulate filter included to meet emissions requirements—particularly particle size and particle number. In this example, engine 10 may produce significant amounts of particulate matter such as soot, which can be trapped in PF 72. However, backpressure will build up due to the accumulation of particulate matter in PF 72. As such, PF 72 may be periodically regenerated, which may require excess oxygen in combination with suitable temperatures. Engine 10, however, when operating under stoichiometric conditions may be unable to provide sufficient excess oxygen for filter regeneration. Accordingly, various approaches are disclosed herein for supplying sufficient excess oxygen for filter regeneration when engine 10 cannot otherwise provide such sufficient oxygen under stoichiometric operating conditions.

FIG. 1 shows the optional inclusion of an energy conversion device 18 and an energy storage device 20. As shown therein, the energy conversion device 18 is coupled to the engine 10. The energy conversion device 18 may include a motor and/or a generator, among others and combinations thereof. The energy conversion device 18 is further shown coupled to the energy storage device 20, which may include a battery, a capacitor, a flywheel, a pressure vessel, etc. The energy conversion device 18 can be operated to absorb energy from vehicle motion and/or the engine and convert the absorbed energy to an energy form suitable for storage by the energy storage device 20 (e.g., provide a generator operation). The energy conversion device 18 can also be operated to supply an output (power, work, torque, speed, etc.) to the drive wheels and/or engine 10 (e.g., provide a motor operation to keep engine spinning while not combusting). It should be appreciated that the energy conversion device 18 may, in some embodiments, include only a motor, only a generator, or both a motor and generator, among various other components used for providing the appropriate conversion of energy between the energy storage device and the vehicle drive wheels and/or engine.

Connections between engine 10, energy conversion device 18, the transmission, and the drive wheels transmit mechanical energy from one component to another, whereas connections between the energy conversion device 18 and the energy storage device 20 may transmit a variety of energy forms such as electrical, mechanical, etc. For example, torque may be transmitted from engine 10 to drive the vehicle drive wheels via the transmission and, as described above, energy conversion device 18 may be configured to operate in a generator mode and/or in a motor mode. In a generator mode, energy conversion device 18 absorbs some or all of the output from engine 10 and/or transmission, which reduces the amount of engine output delivered to the drive wheel, or the amount of braking torque to the drive wheel. Such operation may be employed, for example, to achieve efficiency gains through regenerative braking, improved engine efficiency, etc. Further, the output received by the energy conversion device 18 may be used to charge energy storage device 20. In motor mode, the energy conversion device 18 may supply mechanical output to engine 10 and/or the transmission, for example by using electrical energy stored in an electric battery (e.g., energy storage device 20).

Hybrid-electric propulsion embodiments may include full hybrid systems, in which the vehicle can run on just the engine, just the energy conversion device (e.g., the motor), or a combination of both. Assist or mild hybrid configurations may also be employed, in which engine combustion is the primary torque source, with the hybrid propulsion system acting to selectively deliver added torque, for example during tip-in or other conditions. Further still, starter/generator and/or smart alternator systems may also be used.

From the above, it should be understood that the exemplary hybrid-electric propulsion system is capable of various modes of operation. In a full hybrid implementation, for example, the propulsion system may operate using energy conversion device 18 (e.g., an electric motor) as the only torque source spinning the engine and/or propelling the vehicle. This "electric only" mode of operation may be employed during braking, low speeds, while stopped at traffic lights, etc. In another mode, engine 10 is running (e.g., combusting), and acts as the only torque source powering drive wheel. In still another mode, which may be referred to as an "assist" mode, the energy conversion device 18 may supplement and act in cooperation with the torque provided by engine combustion. As indicated above, energy conversion device 18 may also operate in a generator mode, in which torque is absorbed from engine 10 and/or the transmission.

One or more components discussed with respect to FIG. 1 (e.g., HP EGR valve 142, LP EGR valve 28) and/or other components not shown in FIG. 1 that may potentially be included in system 100 (e.g., turbine wastegate valve, compressor bypass valve, throttle, tailpipe valve) can be manipulated by an electronic controller. In some examples, an objective of such manipulation may include controlling operational aspects of PF 72 (e.g., oxygen storage capacity of the filter, oxygen flow to the filter) and/or an exhaust system (e.g., exhaust gas temperature), as described in further detail below. One example of such an electronic controller is discussed in detail with respect to FIG. 2.

Turning now to FIG. 2, a schematic diagram illustrates one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via a respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 or intake manifold 44 may include a throttle 62 having a throttle plate 64. In this particular example, the position of throttle plate 64, or a throttle opening, may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake manifold 44. In this example, high pressure (HP) EGR passage 140 is illustrated. The amount of EGR provided to intake manifold 44 may be varied by controller 12 via HP EGR valve 142. Further, an EGR sensor 144 may be arranged within the HP EGR passage 140 and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust $O_2$ sensor and/or an intake oxygen sensor (intake manifold). Under some conditions, the EGR system may be used to regulate the temperature of the air and fuel mixture within the combustion chamber and/or the temperature proximate PF 72. While FIG. 2 shows a high pressure EGR system, a low pressure EGR system may additionally, or alternatively, be used. In a low pressure EGR system, EGR may be routed from downstream of a turbine of a turbocharger to upstream of a compressor of the turbocharger, as show in FIG. 1.

As such, engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine 10 and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control device (ECD) 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Although oxygen sensor 14 and temperature sensor 16 are shown in addition to exhaust gas sensor 126 in FIG. 2, one or more of these sensors may be omitted and/or moved.

ECD 70 is shown arranged along exhaust passage 48 downstream of exhaust gas sensor 126. In this example, ECD 70 includes the three-way catalyst (TWC) 71 and the particulate filter (PF) 72. In some embodiments, PF 72 may be located downstream of the TWC 71 (as shown in FIG. 2), while in other embodiments, PF 72 may be positioned upstream of the catalyst (not shown in FIG. 2). Further, PF 72 may be arranged between two or more three-way catalysts, or other emission control devices (e.g., selective catalytic reduction system, NOx trap) or combinations thereof. In other embodiments, TWC 71 and PF 72 may be integrated in a unitary housing as described above. Further, in some embodiments, PF 72 may include one or more catalyst materials and/or oxygen storage materials. Details regarding exemplary ECDs are provided below with reference to FIGS. 3A-B. As described in further detail below, various operational aspects of engine 10 may be controlled to facilitate the performance of various actions on ECD 70, including but not limited to regeneration of PF 72.

Controller 12 is shown in FIG. 2 as a microcomputer, including microprocessor 102, input/output ports 104, an electronic storage medium (e.g., computer-readable) for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP), or throttle opening, from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor 102 for performing the methods described herein, as well as other variants that are anticipated but not specifically listed.

As described above, FIG. 2 shows only one cylinder of a multi-cylinder engine, and each cylinder may similarly include its own set of intake/exhaust valves, fuel injector, spark plug, etc.

FIG. 3A shows an example vehicle exhaust system 300 including an emission control device (ECD) 302. In some examples, ECD 302 may be ECD 70 of FIGS. 1 and/or 2. Exhaust system 300 includes an exhaust manifold 304 with a plurality of exhaust runners or passages from which exhaust gas from engine cylinders (e.g., cylinder 30 of FIG. 2) flows. The exhaust runners are coupled to a collection region 306 upstream of ECD 302, which is followed by an exhaust passage 308. ECD 302 is thus configured to receive exhaust gases from an engine such as engine 10 of FIGS. 1 and 2.

Exhaust manifold 304 includes runners 310, 312, and 314 that converge to form a short, narrow exhaust runner convergence conduit 316. Runners 310, 312, and 314 may have equal or unequal lengths and widths, where the length of a runner may be considered as the measurement along a central axis of the runner from exhaust manifold 304 to the center of an exhaust runner convergence conduit 316, and the width of a runner may be considered as the diameter of the runner at any given cross-section perpendicular to the central axis of that runner. For embodiments in which at least two of runners 310, 312, and 314 exhibit unequal lengths, the longest runner may be positioned at one end (e.g., top, bottom) of exhaust manifold 304. Moreover, at least a portion of one or more of runners 310, 312, and 314 may be substantially (e.g., within 5°) coaxial with at least a portion of ECD 302 (e.g., the longitudinal axis of the ECD).

The geometric properties of runners 310, 312, and 314 may affect various aspects of engine operation. For example, if an exhaust runner diameter is too small, an increase in backpressure in the exhaust system may result due to insufficient exhaust gas flow. Conversely, if the diameter of the exhaust runner is too large, exhaust gas velocity may be low, which may affect the scavenging ability of the exhaust gas. Additionally, exhaust runner length also affects inertia and wave tuning, which may impact the effect scavenging has on power production. Accordingly, the geometry of one or more of runners 310, 312, and 314 may be selected in view of these operational considerations.

In the example depicted in FIG. 3A, ECD 302 comprises a catalyst canister 318 positioned within an ECD body 319. Catalyst canister 318 is particularly positioned proximate and downstream of exhaust runner convergence conduit 316 and upstream of a filter described below. Catalyst canister 318 includes a catalyst brick 320 interposed between mounting mats 322 positioned between the catalyst brick and an upper wall 324 of ECD body 319 and between the catalyst brick and a lower wall 326 of the ECD body. Mounting mats 322 may be comprised of silica fibers, for example. Catalyst brick 320 may be a porous support for metallic catalytic materials which cooperate with a substrate to form a catalyst 321. In some examples, catalyst 321 may be a three-way catalyst (TWC), and may increase the efficiency of cold start exhaust gas emission conversion. As shown in FIG. 3A, catalyst brick 320 is positioned in close proximity to exhaust manifold 304. Such a closely-coupled configuration may encourage the temperature of catalyst brick 320 to rise quickly to its light-off temperature. Upon reaching this light-off temperature, exhaust gas species in exhaust gas may be effectively converted to desirable inert gases.

FIG. 3B shows a block diagram illustrating aspects of vehicle exhaust system 300. In particular, FIG. 3B illustrates aspects of the formation of catalyst brick 320 and example materials that may be carried by the catalyst brick. In the example depicted in FIG. 3B, catalyst brick 320 includes a catalyst brick substrate 328, which in some examples may be a wall-flow substrate. Catalyst brick substrate 328 may employ various suitable substrate materials including high porosity (e.g., 40% to 80%), high surface area substrate materials. Non-limiting examples of suitable catalyst substrate materials include, but are not limited to, ceramics (e.g., synthetic cordierite, aluminum titanate, silicon carbide), minerals (e.g., alumina), and metals (e.g., stainless steel). In some examples, catalyst brick 320 may utilize substrate materials typically employed in catalysts configured for compression-ignition engines. In some implementations, catalyst brick 320 may include catalyst support materials, such as ceria (e.g., Cerium(IV) oxide) or barium for increased stabilization. Catalyst brick 320 may be configured in various suitable manners, such as a monolithic honeycomb structure, spun fibers, or layered materials, for example.

Metallic catalysts react with exhaust gas species, such as NOx, hydrocarbons, and CO, in order to convert such species into desirable inert gases. Catalysts may be carried on catalyst brick substrate 328, and may be loaded onto catalyst brick 320, in a variety of ways. For example, catalyst brick substrate 328 may be coated with a slurry of precursor compound(s) for the metallic catalysts using wet chemical techniques to form a washcoat 330. After disposition of washcoat 330, catalyst brick substrate 328 may be dried and calcined. In the example depicted in FIG. 3B, washcoat 330 includes one or more catalyst materials 332, which may comprise precious metals (e.g., palladium), mixtures of precious metals (e.g., palladium-platinum), or rare earth metals (e.g., yttrium), for example. Washcoat 330 further includes one or more oxygen storage materials 334 to enable the storage of oxygen in ECD 302 so that oxygen may be made available to regenerate a filter described below downstream of catalyst brick 320. Oxygen storage materials 334 may include ceria-zirconia (Ce—Zr), for example.

FIG. 3A also illustrates the cell density of catalyst brick 320. The cell density may be measured in cells per square inch (cspi), and can affect parameters including but not limited to the geometric surface in which the catalyst resides, the mass of exhaust materials that flow through catalyst brick 320, the heat transfer throughout the catalyst brick, and the resulting exhaust backpressure. Increasing the cell density of a catalyst brick leads to an increase in the catalytically effective surface without changing the overall dimensions of the catalyst brick. The physical configurations and chemical properties of catalyst bricks are controlled as necessary for emission quality control, and may be described in terms cell spacing (L) and cell wall thickness (t). The cell density (N), is defined as the number of cells per unit of cross-sectional area, and is inversely related to the cell spacing—e.g., $N=1/(L^2)$. Therefore, if the cell spacing is low, a high number of cells are positioned within the catalyst support space. As a non-limiting example, the catalyst substrates described herein such as substrate 328 may have cell densities ranging from 100-1200 cpsi with cell walls ranging from 0.1-10 mil ($10^{-3}$-$10^{-2}$ inch).

In some examples, catalyst brick 320 may include two or more different cell densities to increase the pressure differential across catalyst substrate 328 and thus reduce the imbalance of exhaust flow through ECD 302. Increasing the catalyst brick pressure differential in this manner may compensate for insufficient mixing of exhaust gases exiting runners 310, 312, and 314 for embodiments in which the two or more of the runners exhibit unequal lengths and/or widths. FIG. 3A shows an axial view 338 within catalyst brick 320 in which lines 340 within the axial view represent the cell walls that support catalyst materials 332 within the catalyst brick. The number of lines 340 correspond to the number of cells, and is related to the cell density of catalyst brick 320 (e.g., more lines per unit distance signifies higher cell density). White space 342 within axial view 338 represents the channels within catalyst brick 320 through which exhaust gas may flow. As shown in FIG. 3A, the cell density of catalyst brick 320 is non-uniform, with the distance between successive lines 340 particularly varying in the vertical direction. It will be appreciated, however, that the cell density of catalyst brick 320 may alternatively or additionally vary in the horizontal direction. In other embodiments, the cell density of catalyst brick 320 may be uniform.

It will be appreciated that ECD 302 is provided as a non-limiting example and that numerous additions and modifications to the ECD may be made without departing from the scope of this disclosure. For example, in other embodiments ECD 302 may include two or more catalyst bricks. In this example, one or more of the multiple catalyst bricks may include two or more different cell densities. The variation in cell densities among the multiple catalyst bricks may be the same or may differ between at least two of the catalyst bricks. Further, the average cell density among the multiple catalyst bricks may be the same or may differ between at least two of the catalyst bricks. Other features may or may not be shared among the multiple catalyst bricks, including but not limited to length, catalyst brick substrate materials, catalyst materials, and oxygen storage materials, if included.

ECD 302 further includes an exhaust sensor 344A positioned at an upper region of the ECD proximate exhaust runner convergence conduit 316. Exhaust sensor 344A may be, but is not limited to, a linear oxygen sensor or universal or wide-range exhaust gas oxygen (UEGO), two-state oxygen sensor (EGO), heated EGO (HEGO), NOx, HC, or CO sensor. In the example depicted in FIG. 3A, exhaust sensor 344A includes internal electrodes (not shown) encased within a metal shield 346. Exhaust gas flow originating from exhaust runners 310, 312, and 314 flows through exhaust runner convergence conduit 316 and is detected by the electrodes of exhaust sensor 344A. The exhaust flow is detected by the electrodes after flowing into metal shield 346 via openings 348 arranged longitudinally along the bottom of the metal shield 346. A sensor housing 350 situates exhaust sensor 344A within ECD body 319 and couples the electrodes to a control system (e.g., controller 12 of FIG. 2)

by wires 352. Readings from exhaust sensor 344A may be used to control operational aspects of ECD 302 as described below.

ECD 302 also includes an exhaust sensor 344B which may be configured similarly to exhaust sensor 344A. As shown in FIG. 3A, exhaust sensor 344B is positioned downstream of catalyst 321. As described in further detail below, readings from both exhaust sensors 344A and 344B may be used to control operational aspects of ECD 302—for example, a difference between the readings from each sensor may indicate an amount of oxygen stored in catalyst 321. It will be appreciated that the positioning of exhaust sensors 344A and 344B is non-limiting and that the sensors may be placed elsewhere. In other embodiments three or more exhaust sensors may be included in ECD 302—for example, a third exhaust sensor positioned downstream of a particulate filter described below, in addition to exhaust sensors 344A and 344B.

FIG. 3A also shows the inclusion of a temperature sensor 335 configured to measure the temperature of exhaust gases flowing through the ECD. As shown therein, temperature sensor 335 is positioned along upper wall 324 and interposed between catalyst 321 and a particulate filter described below. It will be appreciated that this positioning is non-limiting and that temperature sensor 335 may be located elsewhere in ECD 302—for example, upstream of catalyst brick 320 or downstream of the particulate filter. In other embodiments, temperature sensor 335 may be omitted from ECD 302, with exhaust temperature being inferred based on one or more engine operating parameters.

ECD 302 further includes a particulate filter (PF) 336 positioned downstream of catalyst brick 320. PF 336 may be configured to trap particulate matter such as soot mixed with exhaust gas flowing through the particulate filter. As soot and/or other particulate matter accumulates in PF 336, backpressure in the particulate filter may build up, which can interfere with engine operation and reduce fuel economy. As such, PF 336 may be periodically regenerated and soot stored therein burned, for example responsive to a soot level stored in the filter exceeding a threshold. For embodiments in which ECD 302 is used in conjunction with a spark-ignition engine, and PF 336 is a gasoline particulate filter, exhaust gas from the spark-ignition engine may be sufficiently hot to combust soot stored in the filter. However, the spark-ignition engine may be predominantly operated under stoichiometric conditions, in which case a sufficient amount of gaseous oxygen may not be available for combusting the soot stored in PF 336.

In some implementations, catalyst materials 332 carried by catalyst brick 320 may be selected such that the catalyst brick provides three-way catalytic conversion of exhaust gas species. Thus, ECD 302 includes a three-way catalyst (TWC) in this example. Further, PF 336 may take the place of a second TWC that would otherwise assume the location of the PF in ECD 302. Like catalyst brick 320 (e.g., the first TWC), the second TWC may include one or more oxygen storage materials to enable the supply of oxygen for regenerating a particulate filter (e.g., PF 336). Due to the substitution of PF 336 for the second TWC, however, ECD 302 may include less oxygen storage materials relative to the configuration in which the second TWC, and not the particulate filter, is employed. As such, PF 336 may be configured to include one or more oxygen storage materials to compensate the loss in oxygen storage due to omission of the second TWC.

Returning to FIG. 3B, the composition of PF 336 is illustrated in block diagram form. As shown therein, PF 336 may include a filter substrate 354 which in some examples may include one or more of the materials of catalyst substrate 328 (e.g., cordierite, aluminum titante, silicon carbide, alumina, stainless steel). Filter substrate 354 may provide a structure on which suitable filter elements may be disposed. PF 336 further includes a washcoat 356 that may be formed on filter substrate 354 in a manner similar to that described above with regard to the formation of washcoat 330 of catalyst brick 320. In some examples, washcoat 356 may include one or more oxygen storage materials 358, such as Ce—Zr, which may at least partially compensate the otherwise reduced oxygen storage resulting from omission of a second TWC. Oxygen storage materials 358 of PF 336 may or may not be the same as oxygen storage materials 334 of catalyst brick 320. Alternatively or additionally, washcoat 356 may include one or more catalyst materials 360 (e.g., palladium, palladium-platinum, yttrium) configured to store oxygen, which may or may not be the same as catalyst materials 332 of catalyst brick 320. In some examples, catalyst materials 360 may include metal oxide coatings that imbue PF 336 with catalytic properties for water-gas shift, ammonia oxidation, sulfur control, etc.

Thus, depending on the composition of washcoat 356 of PF 336, the particulate filter may enable one or both of catalytic conversion and oxygen storage, complementing the catalytic conversion and oxygen storage provided by catalyst brick 320. As a non-limiting example, washcoat 356 of PF 336 may be configured such that the particulate filter provides three-way catalytic conversion and includes Ce—Zr to facilitate oxygen storage in the filter and oxygen supply as desired for regeneration of the filter.

Washcoat 356 of PF 336 may be selected to both increase soot oxidation in the particulate filter under stoichiometric conditions (by increasing oxygen storage in the filter) and limit increases in backpressure resulting from the inclusion of the washcoat in the filter. To achieve this goal, washcoat 356 of PF 336 may differ from washcoat 330 of catalyst brick 320 with respect to at least one physical parameter—for example, the washcoat 356 of the particulate filter may exhibit a reduced mass, density, volume, etc., relative to that of the washcoat 330 of the catalyst brick. As a non-limiting example, the mass of washcoat 356 of PF 336 may be approximately a third of the mass of washcoat 330 of catalyst brick 320. In this way, backpressure associated with PF 336 may be limited. Due to the reduced coating level of washcoat 356 relative to washcoat 330, however, oxygen storage materials 358 of washcoat 356 may be reduced by the same or similar proportion. To compensate reduced oxygen storage in PF 336 due to the relatively reduced coating level, the density of oxygen storage materials 358 may be increased relative to the density of oxygen storage materials 334 of catalyst brick 320 and/or that of a second TWC that in other approaches would assume the place of the particulate filter.

To illustrate the selection of washcoat 356 and oxygen storage materials 358 of PF 336, a non-limiting example follows. In a typical three-way catalyst (e.g., catalyst 321), approximately 6% of the catalyst weight may be attributed to oxygen storage materials such as ceria (e.g., $CeO_2$). The washcoat of the catalyst may form 30% of the total catalyst weight, with the remaining 70% attributed to the substrate (e.g., cordierite). 20% of the catalyst washcoat weight may be attributed to the oxygen storage materials. The catalyst washcoat may have a density of 1 $g/in^3$; thus, with 20% of the catalyst washcoat corresponding to the oxygen storage materials, 0.2 $g/in^3$ may be attributed to the oxygen storage materials. In an emission control device (e.g., ECD 302) in which a second TWC is omitted and replaced by a particulate filter (PF), the reduced oxygen storage in the ECD resulting from omission of the second TWC may be compensated by increasing the proportion of the oxygen storage materials to the PF washcoat, for example by a factor between 1.5 and 2.5. In other words, reduced oxygen storage due to omission of a second TWC (and its corresponding oxygen storage materials) may be compensated by increasing oxygen storage in a PF replacing the second TWC.

Continuing with this non-limiting example, PF 336 may be configured such that oxygen storage materials 358 constitute between 30% and 50% of the weight of washcoat 356 of the particulate filter. Relative to the typical TWC washcoat described above, this represents between a 10% and a 30% increase in the proportion of oxygen storage materials 358 to washcoat 356. Configured in this way, between 0.3 g/in$^3$ and 0.5 g/in$^3$ of a 1 g/in$^3$ washcoat may be attributed to the oxygen storage materials.

In some examples, the proportion of oxygen storage materials 358 to washcoat 356 of PF 336 may be increased without increasing the mass of the washcoat. This may be accomplished by replacing other constituents of washcoat 356 with oxygen storage materials. As a non-limiting example, washcoat 356 may comprise $\gamma$-$Al_2O_3$, $CeO_2$, $ZrO_2$, one of $La_2O_3$ and $Nd_2O_3$, one of BaO and SrO, NiO, and one of Pt, Pd, and Rh. In this example, the proportion of oxygen storage materials 358 to washcoat 356 may be increased without increasing the mass of the washcoat by replacing an inert component of the washcoat with the oxygen storage materials—for example, by replacing $\gamma$-$Al_2O_3$ with $CeO_2$. In some approaches, the extent to which an inert component of washcoat 356 is replaced with oxygen storage materials 358 may be in proportion to the extent to which the oxygen storage materials are increased relative to a nominal level (e.g., the oxygen storage materials included in a typical TWC washcoat). For example, the portion of the inert material that is replaced by oxygen storage materials 358 may be substantially equal (e.g., within 0.5%) to the portion of the oxygen storage materials that replaces the replaced portion of the inert material, which may prevent increases in weight. In the non-limiting example discussed above in which oxygen storage materials 358 are increased by a factor between 1.5 and 2.5, the inert component of washcoat 356 may be reduced by the same factor by which the oxygen storage materials were increased (e.g., reduced by a factor between 1.5 and 2.5), though in other approaches these factors may be unequal.

Thus, by selecting oxygen storage materials 358 in the manners described above, the otherwise reduced oxygen storage capacity of ECD 302 due to the replacement of a second TWC with PF 336 may be compensated, and in some examples at least match that of an ECD comprising dual TWCs. Consequently, sufficient oxygen may be made available to combust soot (and/or other particulate matter) stored in PF 336, particularly during stoichiometric operation of a spark-ignition engine. Moreover, this may be accomplished without increasing the mass of washcoat 356 by replacing at least one inert constituent of the washcoat with oxygen storage materials 358. FIG. 6 further illustrates the effect of oxygen storage capacity on filter regeneration.

It will be appreciated that various aspects of vehicle exhaust system 300 and ECD 302 may be modified without departing from the scope of this disclosure. For example, the relative positioning, geometries, and dimensions (e.g., length, width, height) of various components of system 300 (e.g., catalyst 321, PF 336, exhaust sensor 344A, temperature sensor 335) may be adjusted. In some embodiments, two or more exhaust sensors and/or temperatures may be provided, while in other embodiments temperature sensor 335 may be omitted from system 300. For example, a first exhaust sensor may be provided upstream of catalyst 321 and a second exhaust sensor may be provided downstream of the catalyst. In some embodiments, two or more ECDs may be provided in a cascaded fashion such that a first ECD (e.g., comprising a catalyst and/or a particulate filter) may be followed by a second ECD positioned downstream of the first ECD, where the second ECD may or may not include the same components as the first ECD. Further, ECD 302 may be modified to include, alternatively or in addition to catalyst 321 and/or PF 336, other emission control devices, such as a NOx trap, SCR catalyst, etc.

FIG. 4A shows an example vehicle exhaust system 400 including an emission control device (ECD) 402. It is sought to explain the differences between FIGS. 3A and 4A, and as such, like parts are numbered similarly. Like ECD 302, ECD 402 thus configured to receive exhaust gases from an engine such as engine 10 of FIGS. 1 and 2. ECD 402 generally differs from ECD 302 of FIG. 3A, however, in that catalytic conversion and filtration of exhaust gas is provided via a single, unitary structure, as opposed to performing catalytic conversion via a catalyst (e.g., catalyst 321) and filtration via a filter (e.g., PF 336) that is separate and positioned away from the catalyst as in ECD 302. As such, ECD 402 includes a catalyst/filter canister 404 that provides the single, unitary structure on which catalytic and filter materials, among other potential elements, may be formed. In this way, simultaneous catalytic conversion and filtration of exhaust gas flowing through ECD 402 may be implemented in a catalyst/filter 406 via the single, unitary structure provided by canister 404.

FIG. 4B shows a block diagram illustrating aspects of vehicle exhaust system 400. In particular, FIG. 4B illustrates aspects of the formation of catalyst/filter 406 and example materials that may be carried by the catalyst/filter. In the example depicted in FIG. 4B, catalyst/filter 406 includes a catalyst/filter substrate 408, which in some examples may be a wall-flow substrate. Substrate 408 may employ various suitable materials that support catalytic and filter materials, including high porosity (e.g., 40% to 80%), high surface area substrate materials such as cordierite, aluminum titante, silicon carbide, alumina, stainless steel, etc. In some examples, catalyst/filter 406 may include support materials such as ceria or barium for increased stabilization.

Catalyst/filter 406 may further include a washcoat 410 with which catalyst/filter substrate 408 may be coated, and then dried and calcined. Washcoat 410 may include one or more catalyst materials 412 that enable the conversion of exhaust gas species (e.g., NOx, hydrocarbons, CO) to desirable inert gases. Catalyst materials 412 may include precious metals (e.g., palladium), mixtures of precious metals (e.g., palladium-platinum), or rare earth metals (e.g., yttrium), for example. Washcoat 410 may further include one or more oxygen storage materials 414 to enable the storage of oxygen in ECD 402 so that oxygen may be made available to combust soot and/or other particulate matter stored in catalyst/filter 406 to thereby regenerate the filter. Oxygen storage materials 414 may include Ce—Zr, for example. In some examples, washcoat 410 may be formed by mixing catalyst materials 412 and oxygen storage materials 414, and then coating substrate 408 with the mixed washcoat. For example, one or more of the catalyst materials described above may be embedded in Ce—Zr to form a washcoat with which substrate 408 may be coated. In some implementations, washcoat 410 may alternatively or additionally include one or more metal oxides that have catalytic properties for one or more of water-gas shift, ammonia oxidation, sulfur control, etc.

FIG. 4A also depicts an axial view 416 within catalyst/filter 406 in which lines 418 within the axial view represent the cell walls that support filter materials, catalyst materials 412, and oxygen storage materials 414. The number of lines 418 correspond to the number of cells, and is related to the cell density of catalyst/filter 406. White space 420 within axial view 416 represents the channels through which exhaust gas may flow. As shown in FIG. 4A, the cell density of catalyst/filter 406 is uniform. In other embodiments, however, the cell density of catalyst/filter 406 may be non-uniform as with ECD 302 of FIG. 3A, for example to increase the pressure differential in ECD 402.

For some embodiments in which ECD 402 is used in conjunction with a spark-ignition engine, catalyst/filter 406 may be configured as a three-way catalyst (TWC) and a gasoline particulate filter (GPF). In this example, the inclusion of oxygen storage materials 414 in washcoat 410 facilitates the provision of sufficient oxygen for combusting soot and/or other particulate matter trapped in catalyst/filter 406. This may be especially advantageous during stoichiometric operation of the spark-ignition engine, when excess oxygen for filter regeneration may otherwise be insufficient.

It will be appreciated that vehicle exhaust system 400 and ECD 402 are provided as non-limiting examples and that various aspects of the system and ECD may be modified without departing from the scope of this disclosure. For example, the relative positioning, geometries, and dimensions (e.g., length, width, height) of various components of system 400 (e.g., catalyst/filter 406, exhaust sensor 344A, temperature sensor 335) may be adjusted. In other embodiments, two or more exhaust sensors and/or temperature sensors may be provided, while in other embodiments temperature sensor 335 may be omitted from system 400. In some implementations, two or more ECDs may be provided in a cascaded fashion such that a first ECD may be followed by a second ECD positioned downstream of the first ECD. In this example, each of the ECDs may include an integrated catalyst/filter (e.g., catalyst/filter 406) implemented in a common housing or separately-housed catalysts and filters. Further, ECD 402 may be modified to include, alternatively or in addition to catalyst/filter 406, other emission control devices, such as a NOx trap, SCR catalyst, etc. Still further, in some embodiments a catalyst and filter may be integrated in a single, unitary housing, but with the catalyst materials and filter materials being separate—for example, the unitary housing may include a first section in which the catalyst is disposed, where the first section is followed downstream by a second section in which the filter is disposed.

Engine operation may be controlled such that ECDs 302 and 402 of FIGS. 3A and 4A, respectively, operate under desired conditions. For example, an engine (e.g., engine 10 of FIGS. 1 and 2) may be controlled such that catalytic conversion of exhaust gas species at a particular rate is achieved to maintain engine emissions within an acceptable range. As catalytic conversion is at least partially a function of temperature, engine operation may be controlled in order to maintain the temperature of the catalysts of ECDs 302 and 402 within a desired range. Engine control in this manner may include utilizing readings from temperature sensor 335, for example, and controlling one or more engine operating parameters via an engine controller such as controller 12 of FIG. 2.

Trapping of particulate matter (PM) such as soot within the particulate filters of ECDs 302 and 402 at a particular rate may also be desired to maintain engine emissions within an acceptable range. As PM accumulates in the filters, however, the backpressure caused by the filters increases, which can reduce fuel economy. Accordingly, PM stored in the filters of ECDs 302 and 402 may be periodically oxidized and the filters regenerated so as to reduce the accumulated PM and limit backpressure. In some examples, the amount of PM stored in the filters of ECDs 302 and 402 may be determined by measuring (e.g., via one or more pressure sensors not shown in FIG. 3A-4B) or inferring the backpressure in the ECDs. A suitable data structure such as a lookup table may then be accessed with the determined backpressure to retrieve a corresponding PM amount (e.g., mass). Alternatively, a transfer function may be used to determine the corresponding PM amount based on the determined backpressure.

When it is determined that oxidation of PM stored in the filters of ECDs 302 and 402, and regeneration of the filters, is desired (e.g., on the basis of the stored PM and/or the backpressure exceeding respective thresholds), the availability of oxygen at the ECDs and their temperatures may be assessed, as regeneration of a PF is generally a function of available excess oxygen and surrounding temperature conditions. Specifically, filter temperature may be controlled to at least a light-off temperature (e.g., 400-600° C.) at which filter regeneration initiates, given sufficient oxygen availability. During filter regeneration, stored PM may be oxidized at a rate greater than the rate at which PM is deposited in the filters. The particulate filter regeneration reaction is exothermic, so once the reaction begins, the temperature may rapidly increase unless the supply of oxygen is carefully controlled. For example, if the temperature exceeds an upper threshold, the reaction may become uncontrollable and can stop altogether, as a level of excess oxygen needed for filter regeneration at high temperatures cannot be supplied. Furthermore, if oxygen supply is insufficient, the regeneration reaction may be unable to sustain itself. Further still, if excess oxygen levels are too high, temperatures may cool, and the regeneration reaction may slow down.

In some examples, oxygen supply to ECDs 302 and 304 may be determined based on backpressure in the ECDs. The oxidation rate of stored PM in ECDs 302 and 304 may be determined based on readings from exhaust sensor 344A and temperature sensor 335, for example; a suitable data structure such as a lookup table may store oxidation rates of PM that are indexed by filter temperature and mass flow rate of oxygen.

Alternatively or in addition to one or more of the considerations described above, control routines may account for the oxygen storage capacity of ECDs 302 and 402. "Oxygen storage capacity" as used herein refers to the capacity of an ECD to store oxygen as determined by the inclusion of one or more oxygen storage materials, which, as described above, may be embedded in a washcoat disposed on a catalyst substrate and/or filter substrate. The oxygen storage capacity of ECDs 302 and 402 may be determined and used to control the supply of excess oxygen to the ECDs, for example so that the amount of excess oxygen supplied to an ECD in a given time interval does not exceed the oxygen storage capacity of the ECD in that time interval. In some examples, excess oxygen supply to ECDs 302 and 402 may be limited to a subset of their oxygen storage capacities—e.g., excess oxygen supply may be limited to 40-60% of the total oxygen storage capacity of an ECD. In one example, the oxygen storage capacity of each of ECD 302 and 402 may be determined by measuring the difference in oxygen concentration sensed by an upstream oxygen sensor and a downstream oxygen sensor under select conditions—for example, the oxygen storage capacity of catalyst/filter 406 of FIG. 4A may be determined based on the difference between readings from exhaust sensor 344A upstream of the catalyst/filter and exhaust sensor 344B downstream of the catalyst/filter during a period in which exhaust gas supplied to the catalyst/filter transitions from rich to lean conditions. Exhaust sensors 344A and 344B may be used to determine the oxygen delivered to an ECD during a transition from rich to lean states. In other implementations, the oxygen storage capacity of ECDs 302 and 402 may be determined by accessing a data structure (e.g., lookup table) holding oxygen storage capacities indexed by temperature (e.g., catalyst temperature, exhaust gas temperature). In this example, an oxygen storage capacity retrieved from the data structure may be adjusted to account for catalyst degradation that can occur over time.

In some implementations, engine operation may be controlled to modify the oxygen storage capacity of ECDs 302 and 402. For example, exhaust gas supplied to ECDs 302 and 402 may be transitioned from rich to lean conditions to adjust ECD oxygen storage capacity. Differences in output from upstream and downstream exhaust sensors may be used to determine when ECD oxygen storage capacity has changed as described above.

Filter regeneration in ECDs 302 and 402 may employ passive and/or active filter regeneration techniques. During passive filter regeneration, engine operation may not be modified to increase the supply of excess oxygen to ECDs 302 and 402. Rather, the engine may be operated nominally (e.g., stoichiometric operation), with previously-stored oxygen in ECDs 302 and 402 used to perform filter regeneration. Particulate matter stored in ECDs 302 and 402 may be oxidized at a rate greater than the rate at which particulate matter is deposited in the ECDs during passive filter regeneration.

Active filter regeneration, conversely, may include adjustments to engine operation to facilitate filter regeneration. For example, engine operation may be modified during active filter regeneration to increase the supply of excess oxygen to ECDs 302 and 402. In some implementations, deceleration fuel shut-off (DFSO) may be initiated under suitable conditions in response to a determination that active filter regeneration should be performed—e.g., responsive to a determination that the amount of particulate matter stored in an ECD exceeds a threshold. In this example, DFSO may be leveraged to increase the supply of excess oxygen to ECDs 302 and 402 and facilitate filter regeneration therein. DFSO may alternatively or additionally be used to increase the amount of oxygen stored in ECDs 302 and 402, which, in some scenarios, replenishes an amount of previously-stored oxygen. In some examples, active filter regeneration during DFSO may include a first phase in which DFSO is leveraged to supply excess oxygen for oxidation of particulate matter. The excess oxygen supplied to ECDs 302 and 402 during the first phase may be substantially used (e.g., 90% or more) in the regeneration reaction, and as such, may not be stored in the ECDs. DFSO may be extended beyond the first phase to a second phase in which excess oxygen is supplied to ECDs 302 and 402 for storage therein, where the stored oxygen may be used for a subsequent filter regeneration event. In contrast, DFSO may only comprise the first phase for scenarios in which DFSO is desired but filter regeneration is not.

Active filter regeneration may include other actions to increase excess oxygen supply to ECDs 302 and 402, including but not limited to adjusting throttle opening (e.g., opening of throttle 62 of FIGS. 1 and 2), air-fuel ratio, variable cam timing, etc. Active filter regeneration may alternatively or additionally include one or more actions to increase exhaust gas temperature at ECDs 302 and 304, such as retarding spark timing and/or increasing throttle opening.

During DFSO, an engine (e.g., engine 10 of FIGS. 1 and 2) is operated without fuel injection while the engine rotates and pumps air through the cylinders. DFSO entry and exit conditions may be based on various vehicle and engine operating conditions. In particular, a combination of one or more of vehicle speed, vehicle acceleration, engine speed, engine load, throttle position, pedal position, transmission gear position, and various other parameters may be used to control enter or exit from DFSO. In one example, the DFSO entry conditions may be based on an engine speed below a threshold. In another example, the DFSO entry conditions may be based on an engine load below a threshold. In still another example, the DFSO condition may be based on an accelerator pedal position. Additionally or alternatively, entry into DFSO may be determined based on a commanded signal to cease fuel injection. Exit out of DFSO may be based on a commanded signal to begin fuel injection in one example. In another example, a DFSO event may be ended based on a driver tip-in, the vehicle speed reaching a threshold value, and/or engine load reaching a threshold value. It will be appreciated that DFSO may include partial cylinder deactivation in which at least one, but not all, engine cylinder is deactivated (e.g., fuel injection therein ceased but air pumped therethrough), while in other examples DFSO may include deactivating all engine cylinders.

FIG. 5 shows a flowchart illustrating a method 500 of regenerating a particulate filter (PF) of an emission control device (ECD). Method 500 may be used to regenerate the PFs of ECDs 302 (FIG. 3A) and/or 402 (FIG. 4A), for example. As such, filter regeneration in method 500 may refer to regeneration of a filter separate from one or more other ECDs or to regeneration of a combined catalyst/filter. In one example, method 500 may be used to regenerate a gasoline PF (e.g., oxidize soot stored therein) positioned downstream of a three-way catalyst (TWC). Method 500 may be stored in memory of controller 12 (FIG. 2) and executed by CPU 102, for example.

At 502 of method 500, particulate matter (PM) such as soot is accumulated in the PF. PM may accumulate in the PF during nominal engine operation—e.g., fuel combustion under stoichiometric conditions—as exhaust gases resulting from fuel combustion flow through the PF.

At 504 of method 500, PM stored in the PF is oxidized with stored oxygen ($O_2$). Oxygen may be stored in various locations in the ECD depending on the configuration of the ECD; for example, oxygen may be stored in ECD components that include oxygen storage materials configured to store oxygen. As such, stored oxygen in the ECD may reside in one or both of the PF and a catalyst, which in some embodiments may be integrated into a combined catalyst/filter as described above. Oxidation of PM stored in the PF may occur once the PF reaches a light-off temperature at which PM oxidation can take place. Further, oxidation of PM stored in the PF at 504 may constitute passive regeneration of the PF if the rate of PM oxidation is greater than the rate at which PM resulting from fuel combustion is deposited in the PF. Passive regeneration of the PF enables at least partial regeneration of the PF without adjusting engine operating parameters to facilitate filter regeneration.

At 506 of method 500, the amount of PM accumulated in the PF and the oxidation rate of PM stored in the PF are determined. In some examples, the amount of PM accumulated in the PF may be determined by measuring (e.g., via a pressure sensor in the exhaust system, by measuring the pressure differential across the PF) or inferring the backpressure caused by the PF, with the measured or inferred backpressure used to access a data structure or transfer function that yields an accumulated PF amount corresponding to the backpressure. The oxidation rate of PM stored in the PF may be determined by accessing a data structure storing oxidation rates of PM that are indexed by temperature and mass flow rate of oxygen, for example, where the temperature may be sensed via temperature sensor 335 (FIG. 3A) and the mass flow rate of oxygen may be sensed based on a difference between readings from exhaust sensors 344A and 344B (FIG. 3A).

At 508 of method 500, it is determined whether or not to actively regenerate the PF. Active filter regeneration may include adjusting one or more engine operating parameters to facilitate active PF regeneration. Determination of whether or not to actively regenerate the PF may be based on the amount of PM accumulated in the PF and/or the oxidation rate of PM stored in the PF, as determined at 506. For example, if the amount of accumulated PM is greater than or equal to a threshold PM amount and/or the oxidation rate of accumulated PM is less than a threshold oxidation rate, active PF regeneration may be performed. If the amount of accumulated PM is less than the threshold PM amount and/or the oxidation rate of accumulated PM is greater than or equal to the threshold oxidation rate, passive PF regeneration, and not active PF regeneration, may be performed. Other conditions may alternatively or additionally be assessed as part of determining whether to actively regenerate the PF—for example, if the backpressure in the ECD is greater than a threshold, active PF regeneration may be performed. If it is determined not to actively regenerate the PF (NO), method 500 returns to 502. In this way, PM stored in the PF may be at least partially oxidized in the passive manner until active regeneration is called for. If it is determined to actively regenerate the PF (YES), method 500 proceeds to 510.

At 510, it is determined whether or not the PF is at a regeneration temperature. The PF temperature may be determined based on output from an exhaust gas temperature sensor such as temperature sensor 335 of FIG. 3A, for example. The regeneration temperature may be a filter regeneration light-off temperature at which, given sufficient excess oxygen, PM accumulated in the PF may be oxidized. If it is determined that the PF is not at (e.g., less than) the regeneration temperature (NO), method 500 proceeds to 512 where the exhaust gas temperature is increased in an effort to bring the PF to the regeneration temperature. The exhaust gas temperature may also be controlled to achieve a desired rate of PM oxidation. Increasing the exhaust gas temperature at 512 may include one or more of retarding spark timing, increasing throttle opening (e.g., opening of throttle 62 of FIG. 1), increasing engine speed, increasing engine load, etc. If it is determined that the PF is at (e.g., greater than or equal to) the regeneration temperature (YES), method 500 proceeds to 516.

At 516 of method 500, active regeneration of the PF is initiated. Initiation of active PF regeneration may include, at 518, initiating deceleration fuel shut-off (DFSO) to provide oxygen for PM oxidation. In some examples, DFSO may be initiated only under select conditions such as those described above; for example, DFSO may be initiated if engine speed and/or load are below respective thresholds, and/or other inputs (e.g., accelerator pedal position) do not indicate an imminent driver tip-in or request for torque. By initiating DFSO, sufficient levels of excess oxygen may be supplied to the PF that, in combination with sufficient temperatures, facilitate oxidation of accumulated PM and at least partial regeneration of the PF. Thus, the PF may be actively regenerated via excess oxygen received from the engine. Other approaches may be employed to increase excess oxygen at the PF, alternatively or in addition to DFSO. For example, one or more of throttle opening, air-fuel ratio (e.g., enleanment), and variable cam timing may be adjusted to increase the supply of excess oxygen.

At 520 of method 500, DFSO is optionally extended to replenish oxygen stored in the PF. In some examples, extension of DFSO at 520 may constitute a second phase of DFSO following a first phase of DFSO. During the first phase of DFSO, excess oxygen may be substantially used to oxidize PM stored in the PF, and not for storage in the PF for subsequent PM oxidation. Accordingly, the first phase of DFSO may be employed for a duration in which the DFSO entry conditions are satisfied and for which a desired amount of the stored PM is oxidized. During the second phase of DFSO, excess oxygen may be substantially stored in the PF for subsequent PM oxidation, and not for oxidation of PM currently stored in the PF. The second phase of DFSO may be performed as long as the DFSO entry conditions are satisfied and if replenishment of stored oxygen is desired and can be performed. In some examples, the duration for which DFSO is extended at 520 may be based on the flow rate of excess oxygen and the oxygen storage capacity of the ECD. For example, DFSO may be extended for a duration that, given the flow rate of excess oxygen, enables the storage of oxygen such that a desired percentage of the oxygen storage capacity is filled—e.g., 40-60%. Once the desired percentage of the oxygen storage capacity is filled, extension of DFSO may be ceased. In this way, the duration of active PF regeneration may be controlled responsive to the oxygen storage capacity of the PF. Following 520, method 500 ends. It will be appreciated, however, method 500 may return to 502 so that the method may be performed on an iterative basis throughout engine operation. Following cessation of active PF regeneration, passive PF regeneration may proceed, for example using stored oxygen stored as a result of extending DFSO at 520.

It will also be appreciated that, in some examples, DFSO may be ceased before a desired amount of PM stored in the PF is oxidized or before the stored oxygen is replenished to a desired level—e.g., due to operating conditions no longer being suitable for DFSO. DFSO may be terminated in response to driver tip-in, for example. In either case, PM oxidation and/or oxygen storage replenishment may be resumed from the point at which it was terminated upon DFSO being subsequently initiated. In some examples, actions other than DFSO may be performed to increase the supply of excess oxygen to the PF if DFSO cannot be performed, including those described above, such as adjusting (e.g., enleaning) air-fuel ratio. For example, following the first phase of active PF regeneration, in which a desired amount of PM stored in the PF is oxidized, air-fuel operation may be adjusted based on the amount of oxygen stored in the PF if the second phase of active PF regeneration cannot be performed. In one example, air-fuel ratio may be enleaned to an extent proportional to the difference between the amount of oxygen stored in the PF and a desired amount of oxygen stored in the PF—e.g., air-fuel ratio may be enleaned to a greater extent for a relatively greater difference between stored oxygen and desired stored oxygen levels, and may be enleaned to a lesser extent for a relatively lesser difference between the two oxygen levels. In other examples, the oxygen storage capacity of the PF may not be filled to a desired extent even upon completion of the second phase of active PF regeneration; in this case, one or more of the actions described above may be performed to supply excess oxygen to complete desired replenishment of the oxygen storage capacity, such as enleanment of air-fuel ration, where the extent of enleanment may be proportional to the desired replenishment. In this way, air-fuel operation may be adjusted after completing active PF regeneration based on the actual oxygen storage level in the PF.

Other actions not shown in FIG. 5 may be performed as part of method 500. As described above, the regeneration reaction at a PF is highly dependent on the supply of excess oxygen and temperature; excessive oxygen supply and temperature can both degrade or terminate the regeneration reaction. As such, method 500 may include limiting one or both of the supply of excess oxygen and exhaust gas temperature if it is determined that either are or will exceed respective thresholds. Further, as described above, exhaust gas temperature may be controlled to achieve a desired regeneration rate. Generally, method 500 may be modified without departing from the scope of this disclosure.

Thus, as shown and described, method 500 may enable regeneration of a particulate filter while taking into account the supply of excess oxygen to the PF as well as the oxygen storage capacity of the overall emission control device. Method 500 enables both passive filter regeneration, in which a PF may at least be partially regenerated without adjusting engine operation to increase the supply of excess oxygen by using oxygen previously stored in the ECD, and active regeneration, in which engine operation may be modified to increase the supply of excess oxygen for filter regeneration and optionally at least partial replenishment of the oxygen storage capacity of the ECD.

In some embodiments, method 500 may be used in conjunction with an ECD, including a catalyst and a particulate filter, having an increased oxygen storage capacity, as a portion of at least one inert component of a washcoat disposed on the catalyst and/or filter is replaced with additional oxygen storage materials. One such ECD may be ECD 302 (FIG. 3A) or ECD 402 (FIG. 4A) described above, which may at least partially replace $\gamma$-$Al_2O_3$, an inert component of a washcoat, with $CeO_2$, an oxygen storage material. In this way, passive filter regeneration may be made more thorough due to increased storage of oxygen in the ECD, which may reduce the frequency with which active passive filter regeneration is employed. Moreover, due to the increased oxygen storage capacity of the ECD, the frequency with which excess oxygen is supplied for storage in the ECD may be reduced. Both effects may reduce engine emissions and increase fuel economy and vehicle drivability, for example.

FIG. 6 shows a graph 600 illustrating how filter regeneration varies as a function of oxygen storage capacity. Graph 600 shows various parameters for four example filter regeneration events that utilized oxygen stored in an emission control device including the filter (e.g., stored in oxygen storage materials included in the filter and/or a catalyst which in some examples may be integrated with the filter in a single housing) to oxidize soot and/or other particulate matter stored in the filter. The four filter regeneration events may have been performed, and their associated data obtained, in a test environment, for example, in which stored oxygen is used to passively regenerate a filter without engaging active filter regeneration and adjusting engine operation for filter regeneration. Implementations are possible, however, in which the filter regeneration events included active regeneration, which in some examples may have been used to a substantially same extent (e.g., within 5%). The fractional regeneration is shown for each filter regeneration event via diamonds, where the fractional regeneration may be the ratio of stored PM oxidized after completion of the regeneration to the ratio of total stored PM prior to initiation of regeneration. The soot loading, represented via squares, is also shown for each filter regeneration event, which provides the soot level in grams per liter stored in the filter prior to regeneration. Graph 600 further shows the oxygen storage capacity, in terms of micromoles, assumed by the filter at each regeneration event.

As seen in FIG. 6, the four filter events exhibit a highly linear correlation between fractional regeneration and oxygen storage capacity. More specifically, the data represented in FIG. 6 show that the fractional regeneration increases in a highly linear fashion with oxygen storage capacity such that a relatively higher fractional regeneration may result when a filter comprises a relatively higher oxygen storage capacity, and a relatively lower fractional regeneration may result when the filter comprises a relatively lower oxygen storage capacity. In some scenarios, this result may simply be a consequence of increased (or reduced) storage of oxygen as determined by the instant oxygen storage capacity. As a non-limiting example, a linear function, represented by a line 602, was fit to the data provided by the four filter regeneration events, having a slope of 0.0003, a y-intercept of 0.3497, and a coefficient of determination of 0.9271.

Graph 600 thus illustrates how maximization of the oxygen storage capacity of an emission control device may be desired in order to maximize the fractional regeneration resulting from regenerating a filter using at least a portion of oxygen stored in the emission control device. By increasing the oxygen storage capacity, a greater proportion of oxygen may be stored for regeneration events, increasing the times in which the filter may be passively, and not actively, regenerated. Substituting at least a portion of active filter regeneration with passive regeneration reduced the frequency with which engine operation is modified for active regeneration, which may reduce emissions and increase fuel economy and vehicle drivability. As described above, in some examples the oxygen storage capacity of an emission control device may be increased without increasing the weight of the emission control device by displacing inert washcoat materials with oxygen storage materials. Increased oxygen storage capacity may also enable better utilization of events in which excess oxygen is provided to an emission control device for oxygen storage.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an emission control device including a catalyst and a filter, comprising:
    passively regenerating the filter;
    adjusting, via a controller, a duration of active regeneration of the filter based on an oxygen storage capacity of the emission control device, wherein active regeneration of the filter includes initiating deceleration fuel shut-off; and
    extending a duration of deceleration fuel shut-off to replenish at least a portion of oxygen stored in the emission control device.

2. The method of claim 1, further comprising:
    determining an amount of particulate matter stored in the filter; and
    actively regenerating the filter if the amount of particulate matter is greater than or equal to a threshold.

3. The method of claim 1, wherein passively regenerating the filter includes oxidizing particulate matter stored in the filter with oxygen stored in the emission control device.

4. The method of claim 1, further comprising:
    if a filter temperature is greater than or equal to a filter regeneration temperature, actively regenerating the filter; and
    if the filter temperature is less than the filter regeneration temperature, increasing exhaust gas temperature.

5. The method of claim 1, further comprising determining the oxygen storage capacity of the emission control device based on output from a first oxygen sensor and output from a second oxygen sensor.

6. The method of claim 1, wherein active regeneration of the filter includes increasing supply of excess oxygen to the emission control device.

7. The method of claim 1, wherein active regeneration of the filter is ceased upon determining that a threshold level of particulate matter stored in the filter has been oxidized, the method further comprising, after cessation of active regeneration of the filter, passively regenerating the filter with oxygen stored in the emission control device, the stored oxygen stored in the emission control device as a result of active regeneration of the filter.

8. The method of claim 1, wherein the catalyst is a three-way catalyst, and wherein the filter is a gasoline particulate filter.

9. A method for an emission control device including a catalyst and a filter, comprising:
    passively regenerating the filter;
    adjusting, via a controller, a duration of active regeneration of the filter based on an oxygen storage capacity of the emission control device, wherein active regeneration of the filter includes initiating deceleration fuel shut-off;
    extending a duration of deceleration fuel shut-off to replenish at least a portion of oxygen stored in the emission control device; and
    adjusting air-fuel operation after completing the active regeneration based on actual oxygen storage level.

10. The method of claim 9, wherein adjusting air-fuel operation includes enleaning an air-fuel ratio to increase excess oxygen at the filter.

11. The method of claim 9, wherein the filter is actively regenerated responsive to an amount of particulate matter stored in the filter being greater than or equal to a threshold, the active regeneration including initiation of deceleration fuel shut-off.

12. The method of claim 9, wherein the active regeneration includes a first phase in which particulate matter stored in the filter is oxidized with oxygen stored in the emission control device, and a second phase in which the oxygen storage capacity is at least partially replenished.

13. An engine system, comprising:
    an engine;
    an emission control device configured to receive exhaust gases from the engine, the emission control device comprising:
        a catalyst;
        a particulate filter; and
        one or more oxygen storage materials configured to store oxygen,
    an engine controller comprising a processor and computer-readable storage holding instructions executable by the processor to:
        determine an amount of particulate matter stored in the particulate filter;
        passively regenerate the particulate filter with oxygen stored in the one or more oxygen storage materials;
        initiate a deceleration fuel shut-off to actively regenerate the particulate filter with excess oxygen received from the engine if the amount of particulate matter is greater than or equal to a threshold;
        extend a duration of deceleration fuel shut-off to replenish at least a portion of oxygen stored in the one or more oxygen storage materials; and
        control a duration of active regeneration based on an oxygen storage capacity of the one or more oxygen storage materials.

14. The engine system of claim 13, wherein the catalyst and the particulate filter are positioned in respective housings separated from each other, and
    wherein the one or more oxygen storage materials are embedded in one or both of a washcoat of the catalyst and a washcoat of the particulate filter.

15. The engine system of claim 13, wherein the catalyst and the particulate filter are integrated in a unitary housing having a washcoat comprising the one or more oxygen storage materials.

16. The engine system of claim 13, wherein the catalyst includes a catalyst washcoat,
   wherein the particulate filter includes a filter washcoat, and
   wherein at least a portion of the one or more oxygen storage materials is embedded in the filter washcoat, the portion of the one or more oxygen storage materials replacing at least a portion of an inert material of the filter washcoat.

17. The engine system of claim 16, wherein the portion of the one or more oxygen storage materials is substantially equal to the replaced portion of the inert material so as not to increase a weight of the particulate filter.

18. The engine system of claim 16, wherein the one or more oxygen storage materials include Ce—Zr, and
   wherein the inert material is $Al_2O_3$.

\* \* \* \* \*